(12) United States Patent
Wu

(10) Patent No.: US 6,408,485 B1
(45) Date of Patent: Jun. 25, 2002

(54) HINGE

(76) Inventor: Yu-Chih Wu, 13/F-1, No. 16, Lane 15, Fulien St., Hsitun Dist., Taichung City (TW)

( * ) Notice: Subject to any disclaimer, the term of this patent is extended or adjusted under 35 U.S.C. 154(b) by 0 days.

(21) Appl. No.: 09/788,394

(22) Filed: Feb. 21, 2001

(51) Int. Cl.⁷ .............................................. E05D 11/08
(52) U.S. Cl. ........................ 16/342; 16/337; 16/340; 248/923; 361/681; 361/683
(58) Field of Search .................... 16/342, 337, 338, 16/340, 341; 361/680, 681, 682, 683; 248/917, 923, 920; 403/119–121, 146

(56) References Cited

U.S. PATENT DOCUMENTS

| | | | | |
|---|---|---|---|---|
| 299,005 A | * | 5/1884 | Peck et al. .................... | 16/340 |
| 1,956,040 A | * | 4/1934 | Meyer ......................... | 16/340 |
| 5,333,356 A | * | 8/1994 | Katagiri ....................... | 16/340 |
| 5,715,576 A | * | 2/1998 | Liu .............................. | 16/303 |
| 5,832,566 A | * | 11/1998 | Quek et al. ................... | 16/342 |
| 5,937,482 A | * | 8/1999 | Horng ......................... | 16/273 |
| 6,101,676 A | * | 8/2000 | Wahl et al. ................... | 16/340 |
| 6,171,011 B1 | * | 1/2001 | Wu .............................. | 16/337 |
| 6,301,748 B1 | * | 10/2001 | Su-Man ....................... | 16/337 |

FOREIGN PATENT DOCUMENTS

| | | | | |
|---|---|---|---|---|
| CH | 0296962 | * | 5/1954 | ................... 16/342 |
| DK | 0107143 | * | 8/1967 | ................... 16/342 |
| DK | 2315914 | * | 10/1974 | ................... 16/342 |

* cited by examiner

*Primary Examiner*—Chuck Y. Mah
(74) *Attorney, Agent, or Firm*—Rosenberg, Klein & Lee

(57) ABSTRACT

A hinge includes a mounting frame and a pivot shaft coupled together and respectively fastened to two movable parts of a computer apparatus for enabling the movable parts to be turned relative to each other, the mounting frame having a barrel, the barrel having a tapered orifice at one end, the pivot shaft having a collar stopped at one end of the barrel and a head stopped at the other end of the barrel, a copper ring mounted on the shaft and fitted into the tapered orifice, and a springy rubber ring mounted on the pivot shaft and fitted into the tapered orifice and supported between the collar of the pivot shaft and the copper ring and adapted to support the pivot shaft in the barrel of the mounting frame in position.

8 Claims, 5 Drawing Sheets

HINGE

BACKGROUND OF THE INVENTION

The present invention relates to a hinge for use in a notebook computer and, more particularly, to such a hinge that can easily be turned to the desired angle and then positively positioned in the adjusted angle.

In a mobile computer, for example, a notebook computer, hinge means is used to couple two movable parts (the mainframe and the LCD module) of the notebook computer, for enabling the movable parts to be turned relative to each other between the close position and the open position. FIGS 1A and 1B show a hinge for this purpose. This structure of hinge comprises a mounting frame 10, a pivot shaft 12, a positioning unit W, and two washers 14. The mounting frame 10 is fixedly fastened to, for example, the mainframe of the notebook computer, comprising a coupling plate 11 and a pivot hole 110 at one end of the coupling plate 11. The pivot shaft 12 comprises a flat rear mounting tail 121 fixedly fastened to, for example, the LCD module of the notebook computer, a threaded shaft body 120 inserted through the pivot hole 110, and a collar 122 disposed between the flat rear mounting tail 121 and the threaded shaft body 120 and stopped at one end of the pivot hole 110. The positioning unit W is fastened to the threaded shaft body 120 of the pivot shaft 12 to secure the pivot shaft 12 to the mounting frame 10, enabling the pivot shaft 12 to be turned relative to the mounting frame 10 and positioned in the desired angle. The positioning unit W comprises two leftwards protruded convex spring plates 16 and 17 mounted on the threaded shaft body 120 of the pivot shaft 12 and attached together, two rightwards protruded convex spring plates 18 and 19 mounted on the threaded shaft body 120 of the pivot shaft 12 and attached together and stopped against the leftwards protruded convex spring plates 16 and 17, a nut 13 threaded onto the threaded shaft body 120 to secure the leftwards protruded convex spring plates 16 and 17 and the rightwards protruded convex spring plates 18 and 19 to the pivot shaft 12, and a flat friction plate 15 mounted on the threaded shaft body 120 of the pivot shaft 12 and stopped between the nut 13 and the rightwards protruded convex spring plate 18. This structure of hinge is still not satisfactory in function. The drawbacks of this structure of hinge are numerous and outlined hereinafter.

1. The positioning force is obtained from the contact areas L around the inner diameter and outer diameter of the convex spring plates 16,17,18 and 19. Because the contact areas L are of line contact, the convex spring plates 16,17,18 and 19 must have high spring power so as to support the pivot shaft 12 in position when squeezed to deform.
2. Because all the component parts of the hinge are made of metal, less positioning force is produced between each two metal component parts. According to test, the coefficient of friction between each two metal members is less than the coefficient of friction between one metal member and one plastic member.
3. Because the spring power of the convex spring plates 16,17,18 and 19 deteriorates with use, the nut 13 must be fastened tight regularly.
4. Frequently opening/closing the two movable parts (the mainframe and the LCD module) of the device (the notebook computer) in which the hinge is installed may cause the nut to loosen, resulting in a positioning failure.
5. The threads of the threaded shaft body 120 of the pivot shaft 12 wear quickly with use because thee convex spring plates 16,17,18 and 19 are forced to rub against the threads of the threaded shaft body 120 of the pivot shaft 12 when opening/closing the two movable parts (the mainframe and the LCD module) of the device (the notebook computer) in which the hinge is installed.
6. Because the positioning unit W requires much installation space, the dimension of the hinge cannot be minimized as desired.
7. Because the hinge is comprised of a big number of parts, the structure of the hinge and its maintenance work are complicated.

SUMMARY OF THE INVENTION

The present invention has been accomplished to provide a hinge, which eliminates the aforesaid drawbacks. It is one object of the present invention to provide a hinge, which has a simple structure. It is another object of the present invention to provide a hinge, which is durable in use. It is still another object of the present invention to provide a hinge, which requires less installation space. It is still another object of the present invention to provide a hinge, which can be conveniently rotated to the desired angle and then positively positioned in the adjusted angle without causing deadlocking. According to one aspect of the present invention, the hinge comprises a mounting frame and a pivot shaft coupled together and respectively fastened to two movable parts of a computer apparatus for enabling the movable parts to be turned relative to each other, the mounting frame having a barrel, the barrel having a tapered orifice at one end, the pivot shaft having a collar stopped at one end of the barrel and a head stopped at the other end. of the barrel, a copper ring mounted on the shaft and fitted into the tapered orifice, and a springy rubber ring mounted on the pivot shaft and fitted into the tapered orifice and supported between the collar of the pivot shaft and the copper ring and adapted to support the pivot shaft in the barrel of the mounting frame in position. According to another aspect of the present invention, the springy rubber ring has raised portions over the surface thereof, which, when the hinge is installed, are deformed and pressed against the inside wall of the barrel and the outside wall of the pivot shaft to positively support the pivot shaft in the barrel in position.

DETAILED DESCRIPTION OF THE PREFERRED EMBODIMENT

Figure 1A:
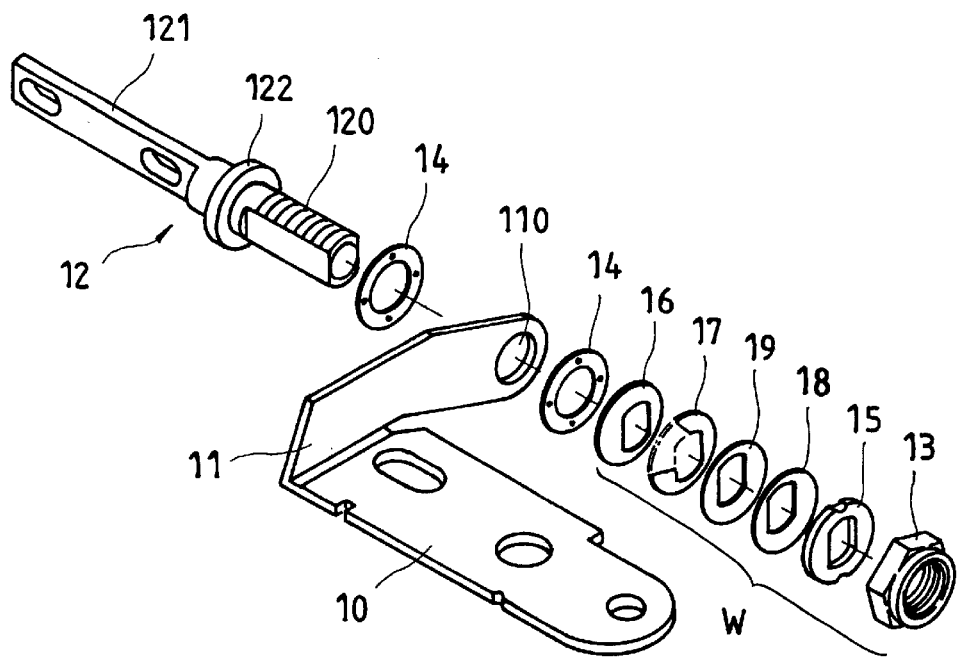
FIG. 1A is an exploded view of a hinge according to the prior art.
Figure 1B:
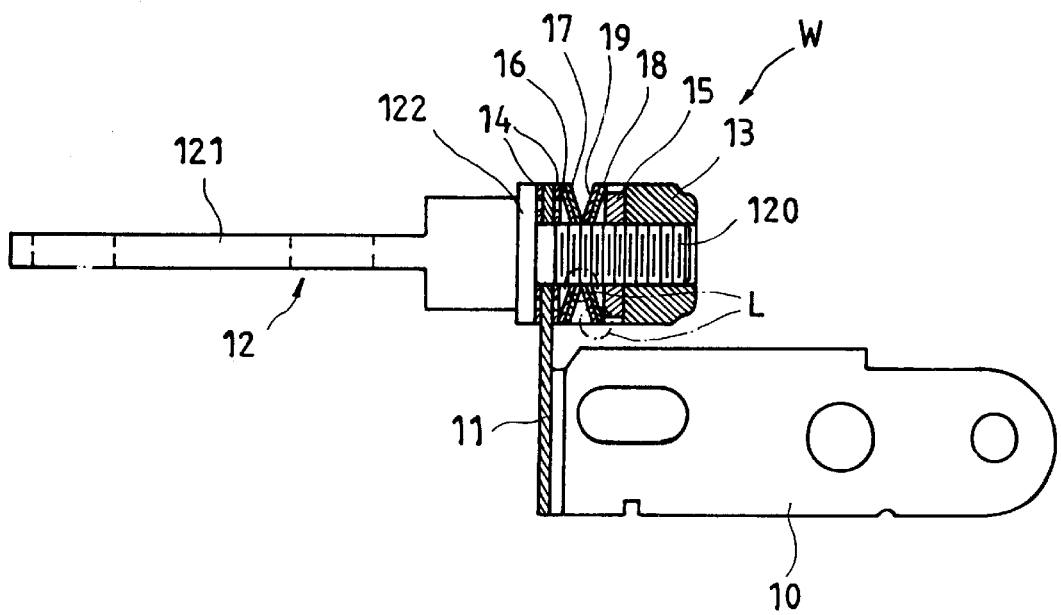
FIG. 1B is a sectional assembly view of the hinge according to the prior art.
Figure 2:
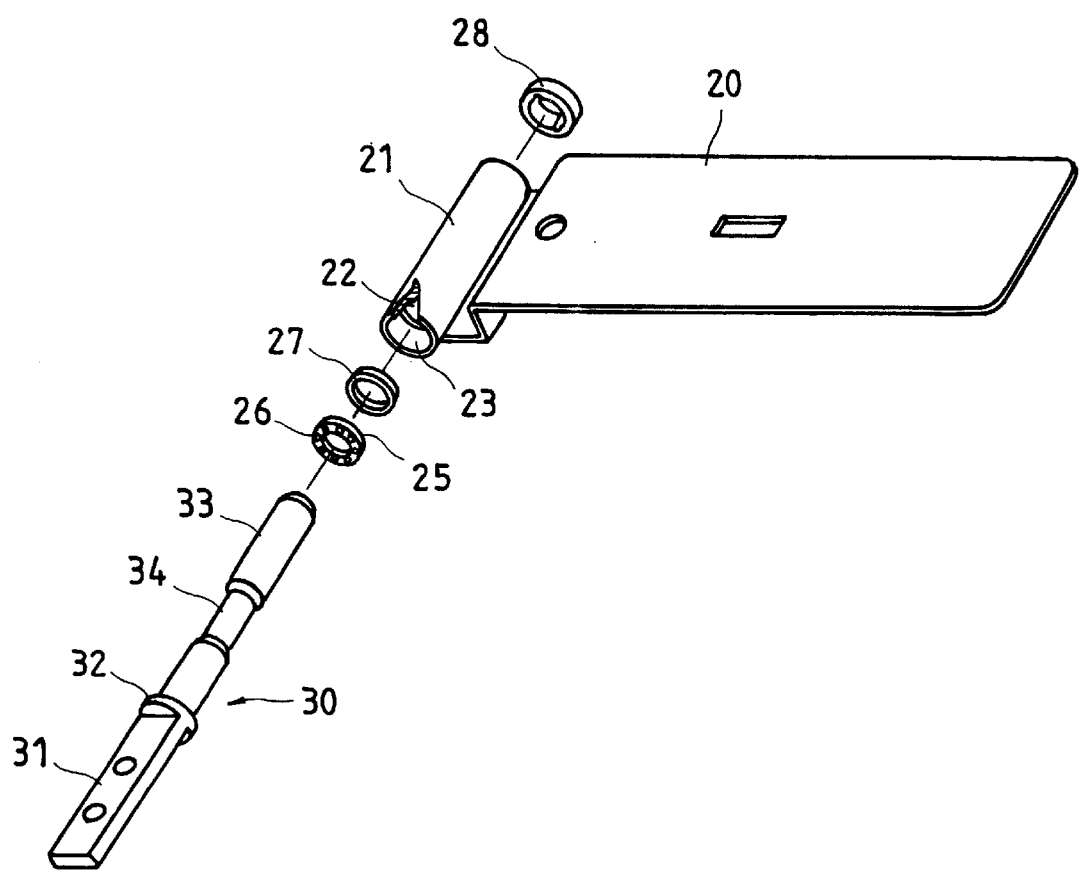
FIG. 2 is an exploded view, partially in section, of a hinge according to the present invention.

Referring to FIGS. from 2 through 4, a hinge in accordance with the present invention is generally comprised of a mounting frame 20 and a pivot shaft 30. The pivot shaft 30 comprises a shaft body 33, a flat rear mounting tail 31 axially extended from one end of the shaft body 33, a collar 32 disposed between the shaft body 33 and the flat rear mounting tail 31, and a neck 34 disposed in the middle of the shaft body 33. The mounting frame 20 comprises a barrel 21 transversely disposed at one end thereof. The barrel 21 defines an axially extended through hole 22 and a tapered orifice 23 at one end of the axially extended through hole 22. The tapered orifice 23 has a diameter made gradually greater from the axially extended through hole 22 toward the outside. A copper ring 27 is press-fitted into the tapered orifice 23 of the barrel 21 and stopped at one end of the axially extended through hole 22. A springy rubber ring 25 is press-fitted into the tapered orifice 23 of the barrel 21 and supported on the copper ring 27. The springy rubber ring 25 has raised portions 26 over the surface thereof. The shaft body 33 of the pivot shaft 30 is inserted through the rubber ring 25 and the copper ring 27 and extended through the barrel 21, and then a reinforcing ring 28 is sleeved onto the shaft body 33 and stopped at one end of the barrel 21, and then the end of the shaft body 33 is hammered down to form a head 330. When hammering down the end of the shaft body 33 to form the head 330, the collar 32 is forced against the rubber ring 25, causing the rubber ring 25 to be deformed and pressed against the inside wall of the barrel 21 and the outside wall of the pivot shaft 30. When assembled, the barrel 21 is coupled to the pivot shaft 30 and stopped between the reinforcing ring 28 and the collar 32 of the pivot shaft 30.

Figure 3A:
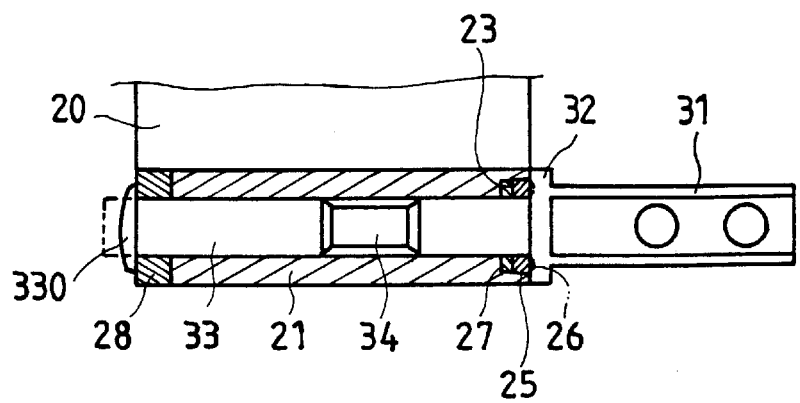
FIG. 3A is an installed view in section of the present invention.
Figure 3B:
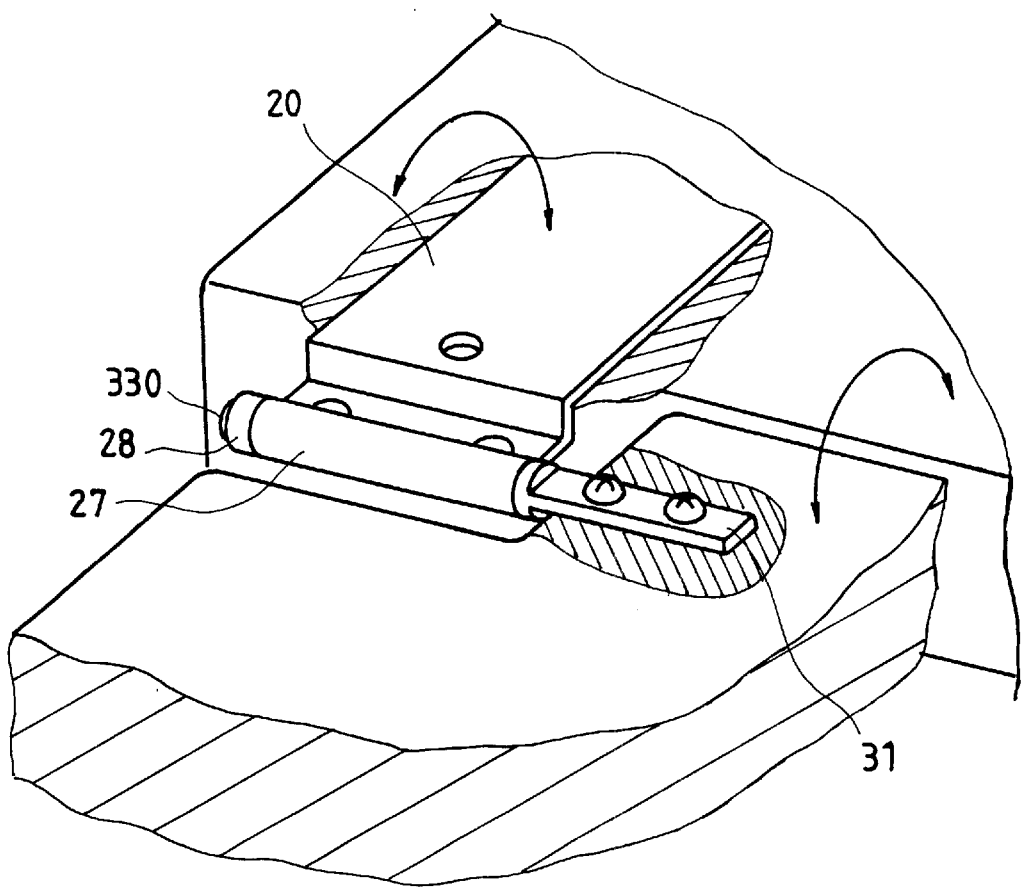
FIG. 3B is an applied view of the present invention.

When in use, as shown in FIGS. 3A and 3B, the mounting frame 20 and the flat mounting tail 31 of the pivot shaft 30 are respectively fixedly fastened to the two movable parts of a device, for example, the mainframe and LCD module (cover panel with LCD module) of a notebook computer.

Figure 4A:
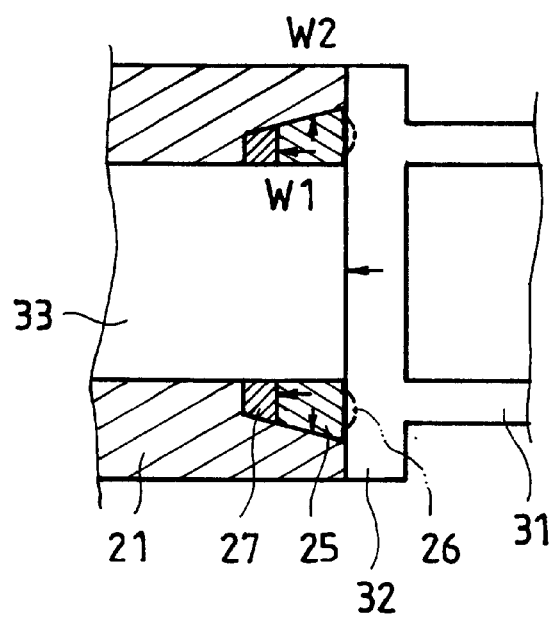
FIG. 4A is a front view in section in an enlarged scale of a part of the hinge according to the present invention.
Figure 4B:
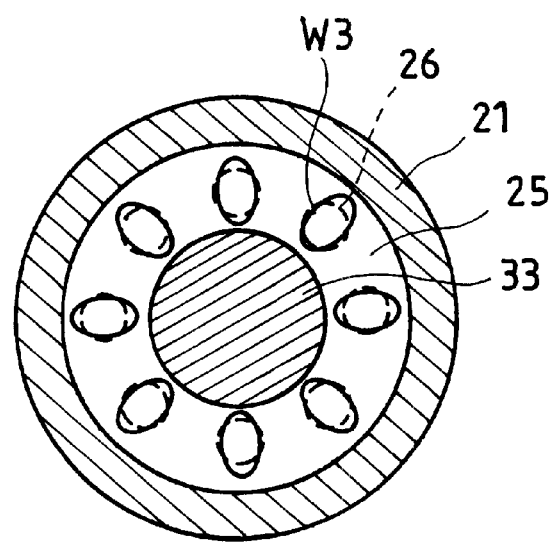
FIG. 4B is a side view in section in an enlarged scale of the hinge according to the present invention.

Referring to FIGS. 4A and 4B, the collar 32 of the pivot shaft 30 is pressed on the rubber ring 25 against the periphery of the tapered orifice 23 of the barrel 21 and the copper ring 27, thereby causing the surface W3 of the raised portions 26 to be forced against one side of the collar 32 of the pivot shaft 30 to stop rotary motion between the mounting frame 20 and the pivot shaft 30. Because the rubber ring 25 is springy, it imparts a sideway pressure W2 and a vertical pressure W1 to the pivot shaft 30 to stop the pivot shaft 30 from rotary motion relative to the mounting frame 20. Because the rubber ring 25 has raised portions 26 over the surface thereof, the outside wall of the rubber ring 25 is a coarse surface, which produces much friction resistance when squeezed against the surface of the pivot shaft 30 to stop the pivot shaft 30 from rotary motion relative to the mounting frame 20. Therefore, the pivot shaft 30 can be rotated relative to the mounting frame 20 only when the user employs much force to one movable part against the other of the device in which the hinge is installed.

As indicated above, the reinforcing ring 28 is coupled to the pivot shaft 30 and stopped between the head 330 and the barrel 21 to eliminate friction resistance between the head 330 and the barrel 21. Because the pivot shaft 30 has a neck 34 in the middle of the shaft body 33, it is less strong and can be axially compressed and shortened when hammering down the end of the shaft body 33 to form the head 330. Therefore, when hammering down the end of the shaft body 33 of the pivot shaft 30 to form the head 330, the length of the pivot shaft 33 is slightly shortened, and the collar 32 of the pivot shaft 30 is squeezed against the rubber ring 25 and the copper ring 27, thereby causing the rubber ring 25 to be deformed and pressed against the inside wall of the barrel 21 and the outside wall of the pivot shaft 30. Because the rubber ring 25 and the copper ring 27 are mounted in the tapered orifice 23 of the barrel 21, the collar 32 is forced against the rubber ring 25, and the rubber ring 25 and the copper ring 27 are positively positioned in the tapered orifice 23 when hammering down the end of the shaft body 33 of the pivot shaft 30. Further, because the rubber ring 25 is supported on the copper ring 27, the pivot shaft 30 can be rotated by force relative to the barrel 21 of the mounting frame 20 without producing a dead locking result. According to the present invention, a torsional force (friction resistance) of about 6 kg/cm is produced when measured by a torsion meter obtained from "Tohnichi" in case the diameter is 4.2 mm, i.e., sufficient to support an object of moment of force about 35 cm and weight about 2 kg.

Because the pivot shaft 30 is riveted to the barrel 21 of the mounting frame 20, the pivot shaft 30 is prohibited from escaping out of the mounting frame 20. According to test, the service life of the hinge is long (sufficient to support more than twenty thousand times of rotation). Because the diameter of the shaft body 33 of the pivot shaft 30 and the diameter of the barrel 21 of the mounting frame 20 are small, the hinge requires less installation space. Because no spring element is used, the present invention eliminates the problem of elastic fatigue.

Figure 5:
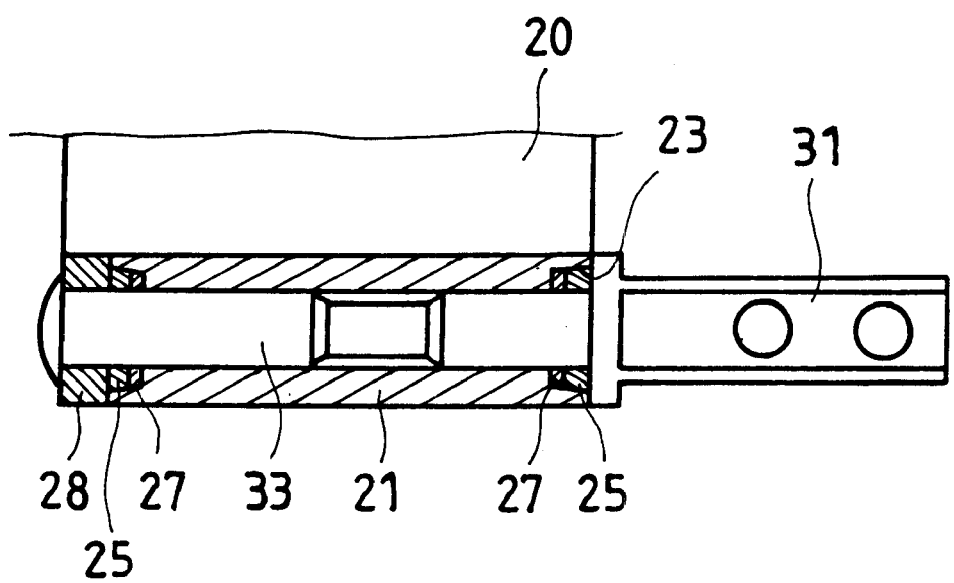
FIG. 5 is a sectional assembly view of an alternate form of the hinge according to the present invention.

FIG. 5 shows an alternate form of the present invention. According to this alternate form, the barrel 21 of the mounting frame 20 has two tapered orifices 23 at two distal ends thereof, two copper rings 27 are respectively mounted in the tapered orifices 23 around the shaft body 33, and two springy rubber rings 25 are respectively mounted in the tapered orifices 23 and supported on the copper rings 27.

Further, the mounting frame 20 and the pivot shaft 30 can be injection-molded from friction resistant plastics.

It is to be understood that the drawings are designed for purposes of illustration only, and are not intended for use as a definition of the limits and scope of the invention disclosed. For example, the raised portions 26 of the springy rubber ring 25 can have any of a variety of shapes; alternatively, the springy rubber ring 25 can be made without the aforesaid raised portions 26; the barrel 21 can be made having. a groove at one or each of the two distal ends thereof for receiving the respective copper ring 27 and the respective springy rubber ring 25 instead of the aforesaid tapered orifice 23; the head 330 can be formed of a nut threaded onto. an outer thread at one end of the shaft body 33 of the pivot shaft 30.

What the invention claimed is:

1. A hinge fastened to two movable parts of a computer apparatus for enabling said movable parts to be turned relative to each other, the hinge comprising:

a mounting frame fixedly fastened to one movable part of the computer apparatus, said mounting frame comprising a barrel transversely disposed at one side thereof, said barrel comprising an axially extended through hole, an orifice at one end of said axially extended through hole, said orifice having a diameter greater than said axially extended through hole;

a pivot shaft, said pivot shaft comprising a shaft body inserted through the axially extended through hole of said barrel of said mounting frame, a flat rear mounting tail axially extended from one end of said shaft body and fixedly fastened to the other movable part of the computer apparatus opposite to said mounting frame, a collar disposed between said shaft body and said flat rear mounting tail and stopped at one end of said barrel of said mounting frame, said shaft body comprising a neck in the middle, and a head stopped at the other end of said barrel of said mounting frame remote from said collar; and a springy rubber ring mounted on the shaft body of said pivot shaft and fitted into the orifice of said barrel of said mounting frame and stopped between one end of said axially extended through hole of said barrel of said mounting frame and said collar of said pivot shaft and adapted to support said pivot shaft in said barrel of said mounting frame in position.

2. The hinge of claim 1 wherein said springy rubber ring as raised portions over the surface thereof.

3. The hinge of claim 1 further comprising a copper ring mounted on the shaft body of said pivot shaft and fitted into the orifice of said barrel of said mounting frame and supported between one end of said axially extended through hole of said barrel of said mounting frame and said springy rubber ring.

4. The hinge of claim 1 wherein said orifice is tapered, having a diameter gradually increased from one end of said axially extended through hole toward the outside of said barrel.

5. The hinge of claim 1 further comprising a second orifice disposed at the other end of said axially extended through hole adjacent to the head of said shaft body of said pivot shaft, a second springy rubber ring mounted on said shaft body of said pivot shaft and fitted into said second orifice and stopped between one end of said axially extended through hole and said head of said shaft body of said pivot shaft, said second springy rubber ring having raised portions over the surface thereof, and a copper ring mounted on said shaft body of said pivot shaft and fitted into said second orifice and supported between one end of said axially extended through hole and said second springy rubber ring.

6. The hinge of claim 1 wherein said mounting frame and said pivot shaft are respectively injection-molded from friction resistant plastics.

7. The hinge of claim 1 further comprising a reinforcing ring mounted on said shaft body of said pivot shaft and stopped between the other end of said barrel of said mounting frame and said head of said shaft body of said pivot shaft.

8. The hinge of claim 1 wherein said head of said shaft body is a nut threaded onto an outer thread at the other end of said shaft body.

* * * * *